(12) United States Patent
Donald et al.

(10) Patent No.: US 11,422,834 B2
(45) Date of Patent: Aug. 23, 2022

(54) SYSTEMS AND METHODS FOR IMPLEMENTING AUTOMATED BARRIERS AND DELAYS FOR COMMUNICATION

(71) Applicant: Oath Inc., New York, NY (US)

(72) Inventors: John Donald, Los Angeles, CA (US); Eric Theodore Bax, Sierra Madre, CA (US); Kimberly Williams, Burbank, CA (US); Tanisha Sharma, Los Angeles, CA (US); Melissa Susan Gerber, Los Angeles, CA (US); Nikki Mia Williams, Gardena, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 3 days.

(21) Appl. No.: 16/363,413

(22) Filed: Mar. 25, 2019

(65) Prior Publication Data
US 2020/0310832 A1 Oct. 1, 2020

(51) Int. Cl.
*G06F 9/451* (2018.01)
*G06F 3/0482* (2013.01)

(52) U.S. Cl.
CPC ............ *G06F 9/451* (2018.02); *G06F 3/0482* (2013.01)

(58) Field of Classification Search
CPC .................. G06Q 10/107; G06Q 10/10; G06F 2221/2133; G06F 21/316; G06F 2221/2103; G06F 16/583; G06F 21/566; G06F 9/451; G06F 3/0482
See application file for complete search history.

(56) References Cited

U.S. PATENT DOCUMENTS

| | | | | |
|---|---|---|---|---|
| 6,252,988 B1* | 6/2001 | Ho | ........................ | G06K 9/6256 382/161 |
| 8,046,832 B2* | 10/2011 | Goodman | ............... | H04L 51/12 726/23 |
| 8,112,483 B1* | 2/2012 | Emigh | ..................... | G06F 21/36 709/206 |
| 8,510,795 B1* | 8/2013 | Gargi | ........................ | G09B 5/06 382/276 |
| 9,264,418 B1* | 2/2016 | Crosley | .................... | H04L 63/08 |
| 2005/0050145 A1* | 3/2005 | Lowe | ........................ | H04L 29/06 709/206 |
| 2009/0186635 A1* | 7/2009 | Vieri | .................... | G06Q 30/0241 455/466 |
| 2010/0229223 A1* | 9/2010 | Shepard | ................... | H04L 67/02 726/5 |
| 2012/0131108 A1* | 5/2012 | Barsness | ............... | G06Q 10/107 709/206 |
| 2018/0332446 A1* | 11/2018 | Seidman | .................. | H04W 4/12 |
| 2019/0286451 A1* | 9/2019 | Awadallah | ............... | G06N 3/04 |

* cited by examiner

*Primary Examiner* — Nhat Huy T Nguyen
(74) *Attorney, Agent, or Firm* — Cooper Legal Group LLC

(57) ABSTRACT

One or more computing devices, systems, and/or methods for implementing automated barriers and delays for communication are provided. Content generated by a user may be evaluated to classify the content before the content has been submitted for access by other users. A user interface is generated and populated with an activity for the user to perform based upon a classification of the content. The user may be restricted from submitting the content until successful performance of the activity. Upon determining that the user successfully performed the activity, the user may be provided with an option to submit the content. Otherwise, the user may be blocked from submitting the content.

20 Claims, 10 Drawing Sheets

SYSTEMS AND METHODS FOR IMPLEMENTING AUTOMATED BARRIERS AND DELAYS FOR COMMUNICATION

BACKGROUND

Users can communicate through various mediums using computing devices. For example, a user can send text messages and emails through a mobile device. The user may connect to a social network in order to create, share, and view content, such as images, videos, and text. Users may join a chat room or access a forum in order to communicate with one another. Some applications may allow users to post messages, post videos, or share other content for friends and/or the public to view.

With electronic communication, there are instances where a user may communicate before fully and rationally thinking through the communication. The user may create an email out of anger, which may cause a recipient to negatively react. The user may post a social network post that is inappropriate, irresponsible, negative, or hurtful based upon impulse, acting out of character, or not fully realizing how others will perceive the social network post. This can cause friends and the public to shame the person, and could lead to other serious consequences such as being fired from a job.

SUMMARY

In accordance with the present disclosure, one or more computing devices and/or methods for implementing automated barriers and delays for communication are provided. A user may utilize a computing device, such as a computer, a tablet, a mobile device, a wearable device, etc. to engage in electronic communication. For example, the user may be sending an email, a text message, submitting a social network post, posting a video, commenting on a social network post, communicating through a chat room, etc. Content being generated by the user may be evaluated using various classification techniques, such as machine learning (e.g., Naive Bayes), image recognition, a text parser and classifier, an entity classifier, audio and voice recognition, a feature extractor, and/or a variety of other techniques that can classify content. The content is classified in order to identify particular types of content that could result in negative consequences if shared with others (e.g., angry messages, racist messages, sexist messages, messaging regarding controversial topics, hurtful or slanderous messages, inappropriate messages, etc.). In this way, a classification of the content is determined. The content generated by the user (e.g., a social network post) may comprise content items that the user generated (e.g., text composed by the user) and/or did not generate (e.g., a photo the user found through a search engine), and thus the classification of the content my include evaluating the content items such as the text and photo.

If the classification is deemed to not result in negative consequences if shared with others (e.g., a message about a new videogame system being released), then no barrier or delay is imposed, and the user is able to submit the content for access by other users. If the classification is deemed to potentially result in negative consequences if shared with others (e.g., a racist remark), then one or more barriers and/or delays or combinations thereof are implemented before the user is able to submit the content. This gives the user the opportunity to rationally think through submitting the content so that the user may cancel submitting the content or modify the content.

In an example of a barrier and/or delay, a user interface is generated with an activity for the user to perform. Until the user successfully performs the activity or the user invokes an override mechanism (e.g., checking a box that the user is willing to accept any negative consequences of sharing the content), the user is blocked from submitting the content. The activity may correspond to a puzzle, a game, a math problem, an article to read and/or answer questions about, a cool down timeout period, a video to watch and/or answer questions about, a question and answer session, a suggested activity (e.g., count to ten, take a walk, etc.), etc. If the user successfully performs the activity, then the user is provided with an option to submit the content.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
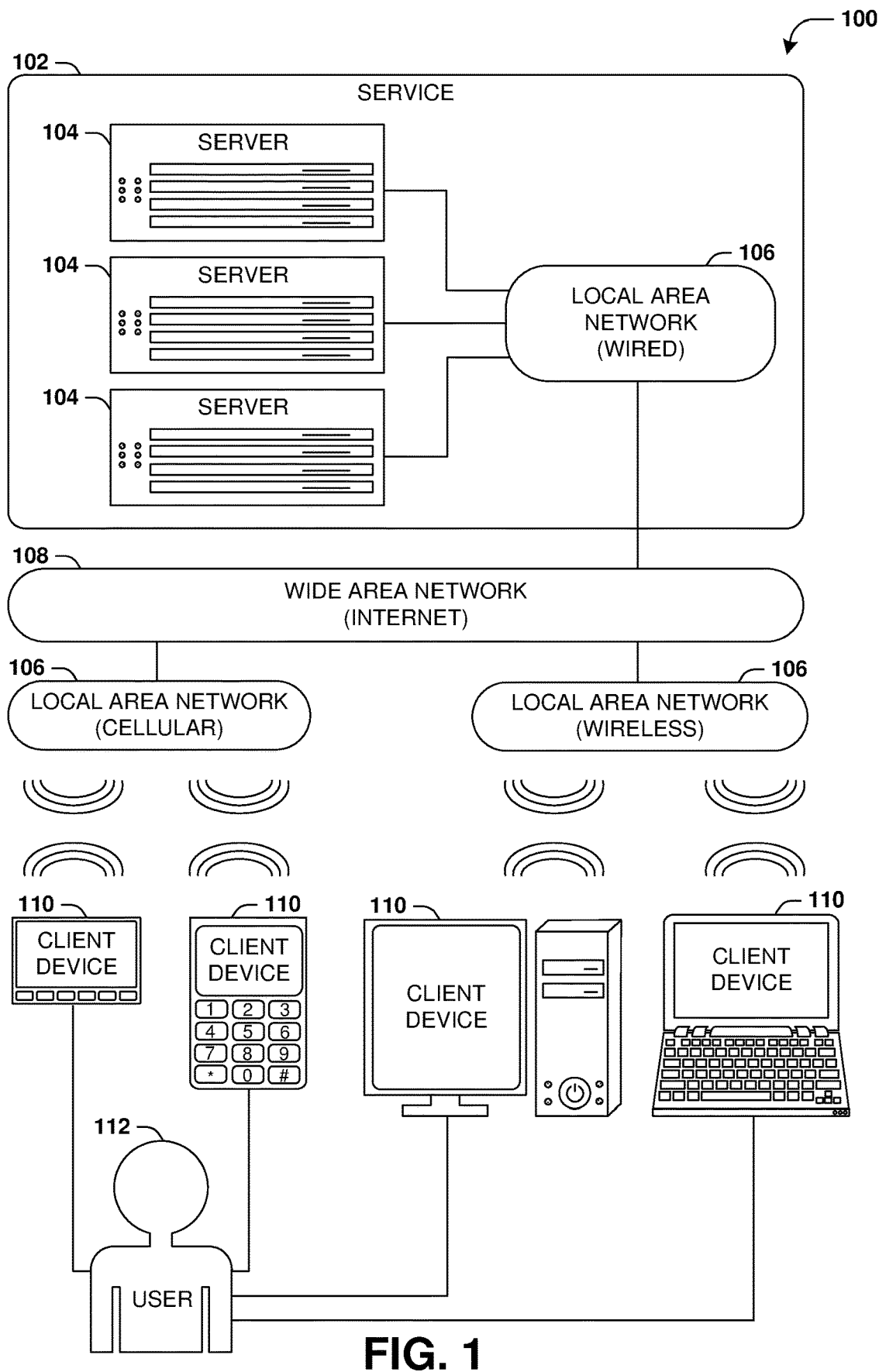
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
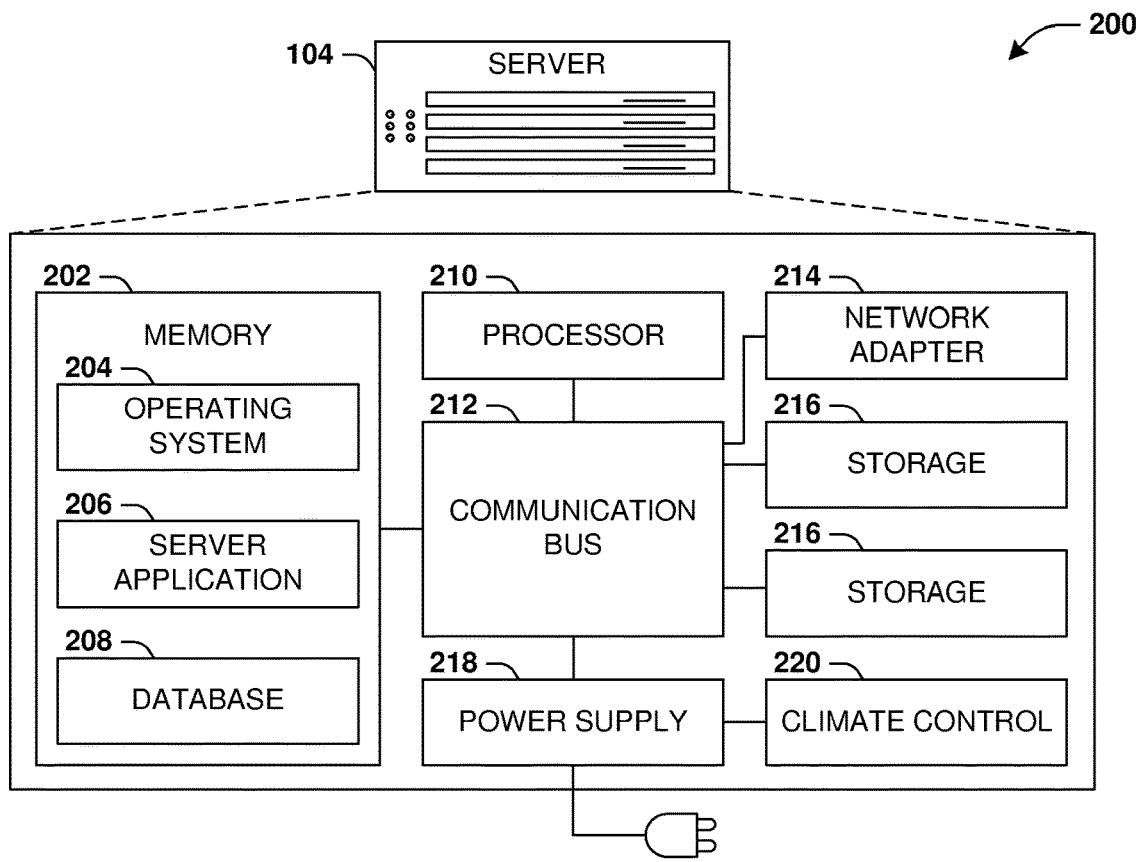
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
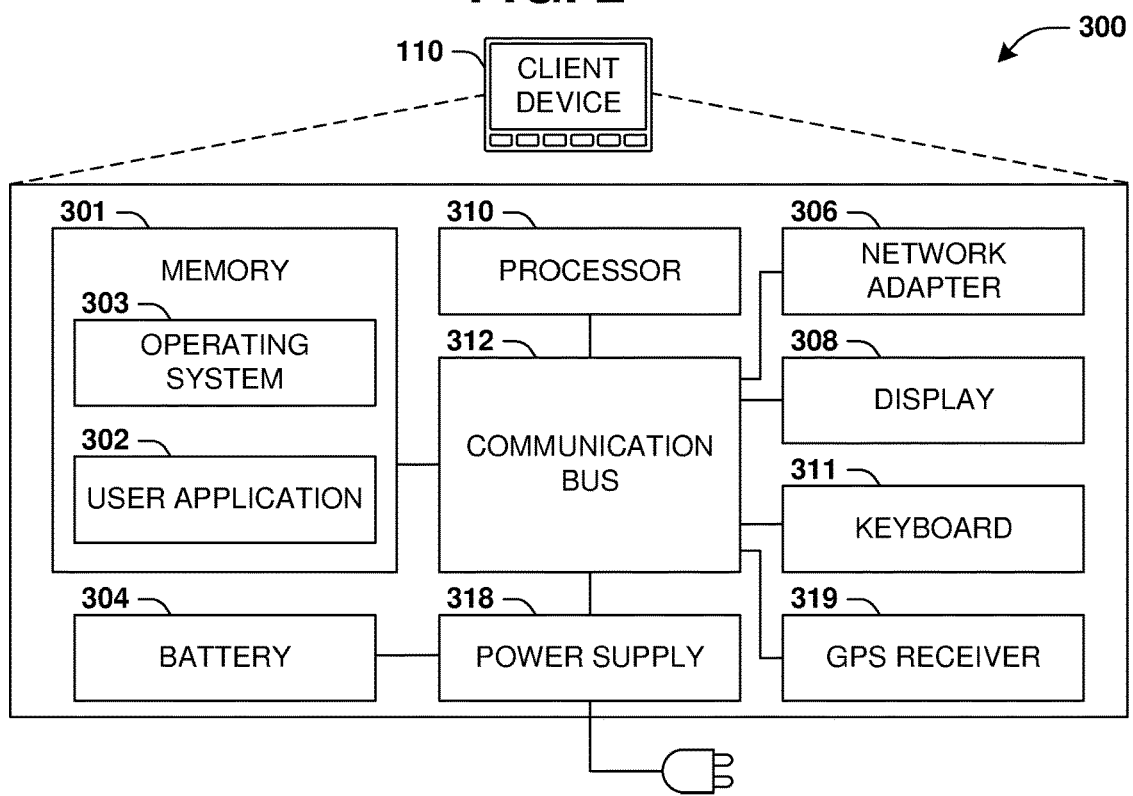
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for implementing automated barriers and delays for communication are provided. Automated barriers and delays may be implemented for various types of electronic communication in order to help a user further think about whether content being communicated is appropriate or inappropriate (e.g., hurtful, slanderous, racist, a message that could be misinterpreted in a negative view, etc.) so that the user may modify the content or cancel the sharing of the content. Automated barriers and delays may be implemented for emails, text messages, social network posts, social network video shares, sharing of images, chat room conversations, forum communication, replies to social network posts, reactions to social network posts, videogame messaging, and/or a variety of other types of electronic communication. In this way, the operation of applications, services, and other computer user interfaces is dynamically modified to enforce barriers and delays to improve user interaction with such applications, services, and user interfaces executing on computing devices so that the user can rationally think through how the user interfaces with and shares content through the computer implemented applications, services, and user interfaces.

Figure 4:
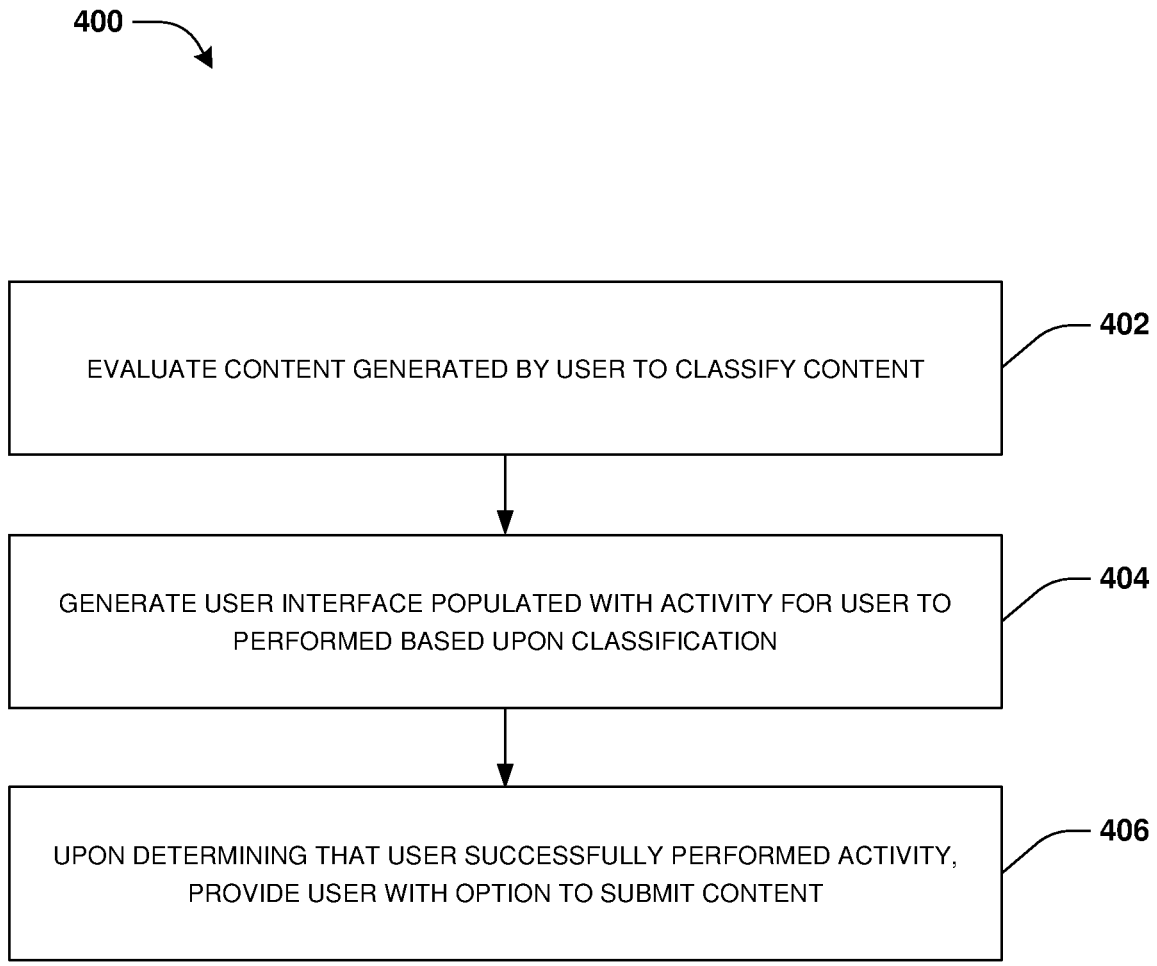
FIG. 4 is a flow chart illustrating an example method for implementing automated barriers and delays for communication.

An embodiment of implementing automated barriers and delays for communication is illustrated by an example method 400 of FIG. 4, which is described in conjunction with system 500 of FIGS. 5A-5F. A user may utilize a computing device 502 (e.g., a tablet, a mobile device, a laptop, a wearable device, a smart device, etc.) to engage in various types of electronic communication. A computer component may be configured to implement automated barriers and delays for electronic communication of the user through the computing device 502. The computer component may be implemented within the computing device 502 as a standalone component or a component of an application or user interface (e.g., a plug-in to an email application or functionality incorporated into code of the email application) or may be implemented on a remote device such as a server hosting an email service.

The computer component may be configured to detect content that the user is going to share with other users, such as an email, a text message, a social network message, a social network post, a video post (e.g., a short video such as a snap), a reaction or comment on a social network post, a link to external content, text of a chat room message, etc. At 402, content generated by the user is evaluated to classify the content. In an example, the content may comprise a message, a post, or other content comprising content items that user did (e.g., text created by the user) or did not generate (e.g., an image that the user found and is sharing through a social network post). Thus, the content items within the content may be evaluated for classifying the content. The content is evaluated and classified before the user has submitted the content for access by other users, such as before an email has been sent or a social network post has been posted.

Various classification techniques may be used to classify the content, such as machine learning (e.g., Naive Bayes), image recognition, a text parser and classifier, entity extraction, audio and voice recognition, a feature extractor, and/or a variety of other techniques that can classify content and content items comprised therein. A list of classifications that will trigger the implementation of a barrier or delay may be maintained. The list of classifications may comprise an anger classification, a racist classification, a controversial topic classification, a hurtful classification, a slanderous classification, a sexist classification, an inappropriate classification, a negative interpretation classification (e.g., a message that could be easily misinterpreted in a negative manner), an out of context classification (e.g., a message that could be easily taken out of context), and/or a variety of other classifications for which it may be beneficial to implement a delay or barrier so that the user has additional time to think through sharing the content.

At 404, a user interface is generated to comprise an activity or instructions of an activity for the user to perform based upon the classification of the content matching a classification within the list of classifications that will trigger the implementation of a barrier or delay. The user may be restricted from submitting the content until successful performance of the activity. In an example, the user may be provided with an override option that will allow the user to submit the content without performing the activity (e.g., the user may check a box indicating that the user still wants to submit the content and that the user is willing to fully accept the potential negative consequences of submitted the content). In an example, the user may be provided with the override option only for certain classifications of content. In an example, the user may be provided with the override option only for content having a certain lower threshold of severity of a consequence of the content being submitted (e.g., override may be allowed for potentially annoying someone or hurting someone's feelings, as opposed to job loss where no override option is provided). In an example, the user may be provided with the override option only for content having a lower likelihood of a consequence actually occurring from the content being submitted.

Various types and/or combinations of activities may be populated within the user interface. In an example, one or more activities may be selected based upon a classification of the content. For example, a first activity (e.g., a cool off period with varying degrees of cool off times that are based upon a severity of the content such as where the user must wait longer the angrier a message is determined to be) may be used for angry messages. A second activity (e.g., obtaining approval from a second user) and a third activity (e.g., having the user watch a video about people losing their jobs from posting racist social network posts) may be used for racist social network posts. In this way, activities may be selected based upon the classification of the content. In another example, one or more activities may be randomly selected. In another example, one or more activities may be selected based upon a severity of a consequence of the content being submitted (e.g., job loss, public shaming, annoying someone, hurting someone's feelings, or other consequences may be used to determine which activities to implement and parameters of the activities such as a number of questions that must be answered, a complexity of a puzzle, a length of a cool down time, etc.). In an example, one or more activities may be selected based upon a likelihood of a consequence actually occurring from the content being submitted. At 406, the user may be provided with the option to submit the content based upon determining that the user successfully performed the activity. Otherwise, the user may be blocked from submitting the content.

Figure 5A:
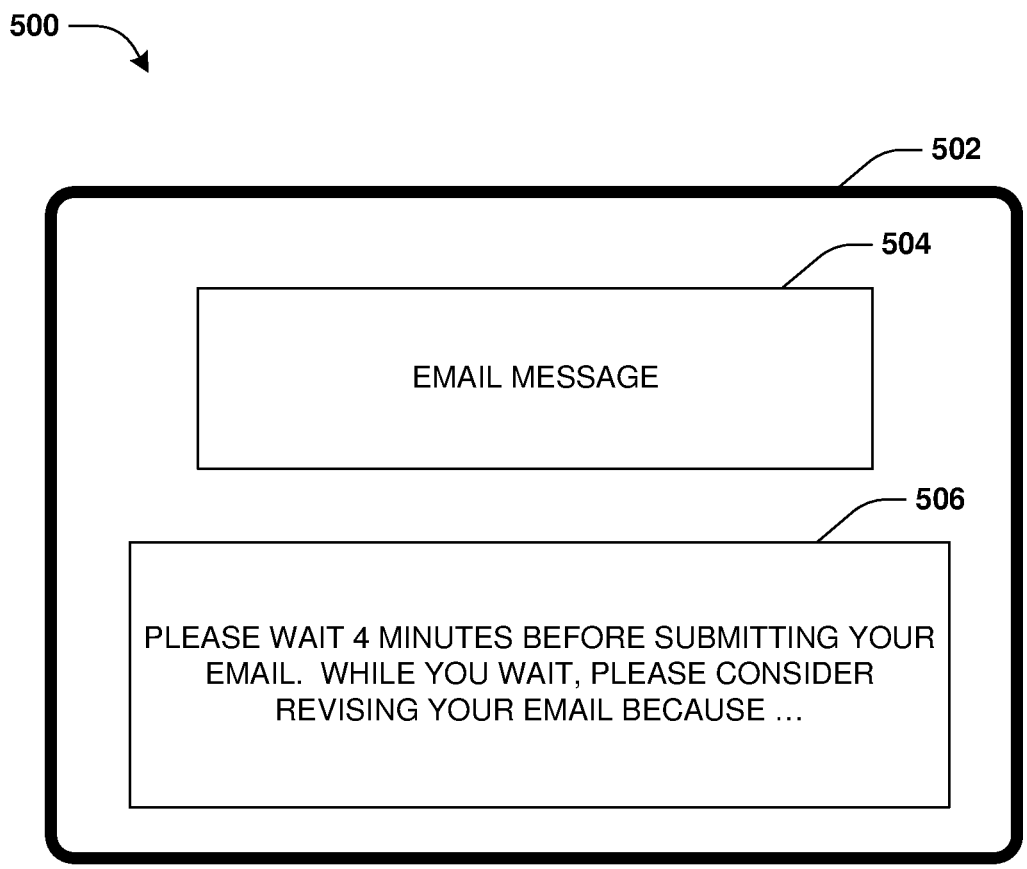
FIG. 5A is a component block diagram illustrating an example system for implementing automated barriers and delays for communication, where a cool off period is implemented.

In one example, the user may be sending an email message 504 to a boss, as illustrated by FIG. 5A. The email message 504 may be evaluated to classify the email message 504. For example, the email message 504 may be classified as an annoying classification. The annoying classification may be determined to be within the list of classifications that will trigger the implementation of a barrier or delay. The annoying classification may be mapped to a cool off period for the user to wait before being able to submit the email message 504 to send to the boss. Accordingly, a user interface 506 may be generated and populated with the cool off period activity. Upon expiration of the cool off period, the user will be provided with the ability to send the email message 504. The user may be blocked from sending the email message 504 until expiration of the cool off period. The user interface 506 may be populated with a message explaining why the email message 504 was classified as annoying (e.g., certain words or phrases may be highlighted). The user interface 506 may be populated with proposed revisions to make the email message 504 not annoying (e.g., rewording of certain phrases, removal of certain words, removing underlining or bolding, etc.). The user interface 506 may provide a video, an audio message, a text message, an image, or other information explaining the consequence of sending the email message 506.

Figure 5B:
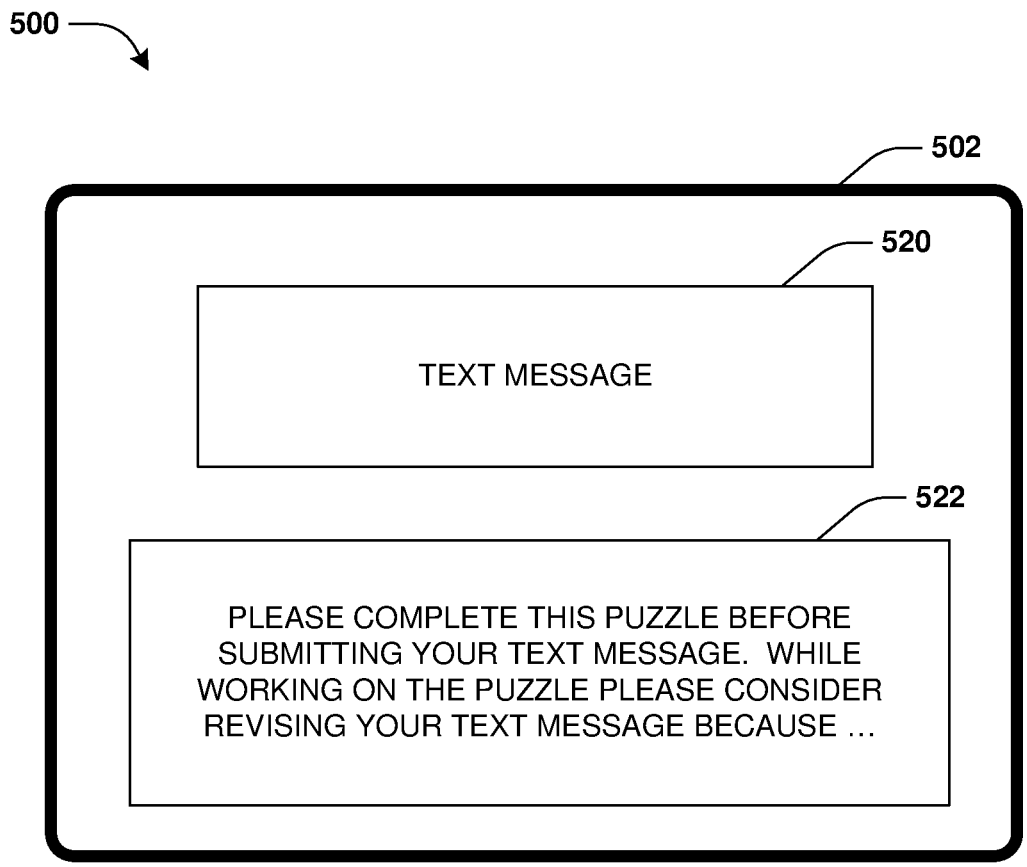
FIG. 5B is a component block diagram illustrating an example system for implementing automated barriers and delays for communication, where a puzzle activity is provided.

In one example, the user may be sending a text message 520 to a group of friends, as illustrated by FIG. 5B. The text message 520 may be evaluated to classify the text message 520. For example, the text message 520 may be classified as an explicit classification. The explicit classification may be determined to be within the list of classifications that will trigger the implementation of a barrier or delay. The explicit classification may be mapped to a puzzle activity for the user to complete before being able to submit the text message 520 to send to the group of friends. Accordingly, a user interface 522 may be generated and populated with the puzzle activity. Upon successful completion of the puzzle activity, the user will be provided with the ability to send the text message 520. Otherwise, the user may be blocked from sending the text message 520. The user interface 522 may be populated with a message explaining why the text message 520 was classified as explicit (e.g., certain words or phrases may be highlighted, an image may be marked up to illustrate what portion of the image was deemed to be explicit, etc.). The user interface 522 may be populated with proposed revisions to make the text message 520 not explicit, such as to remove an attached photo deemed to be explicit by image recognition functionality. The user interface 522 may provide a video, an audio message, a text message, an image, or other information explaining the consequence of sending the text message 520.

Figure 5C:
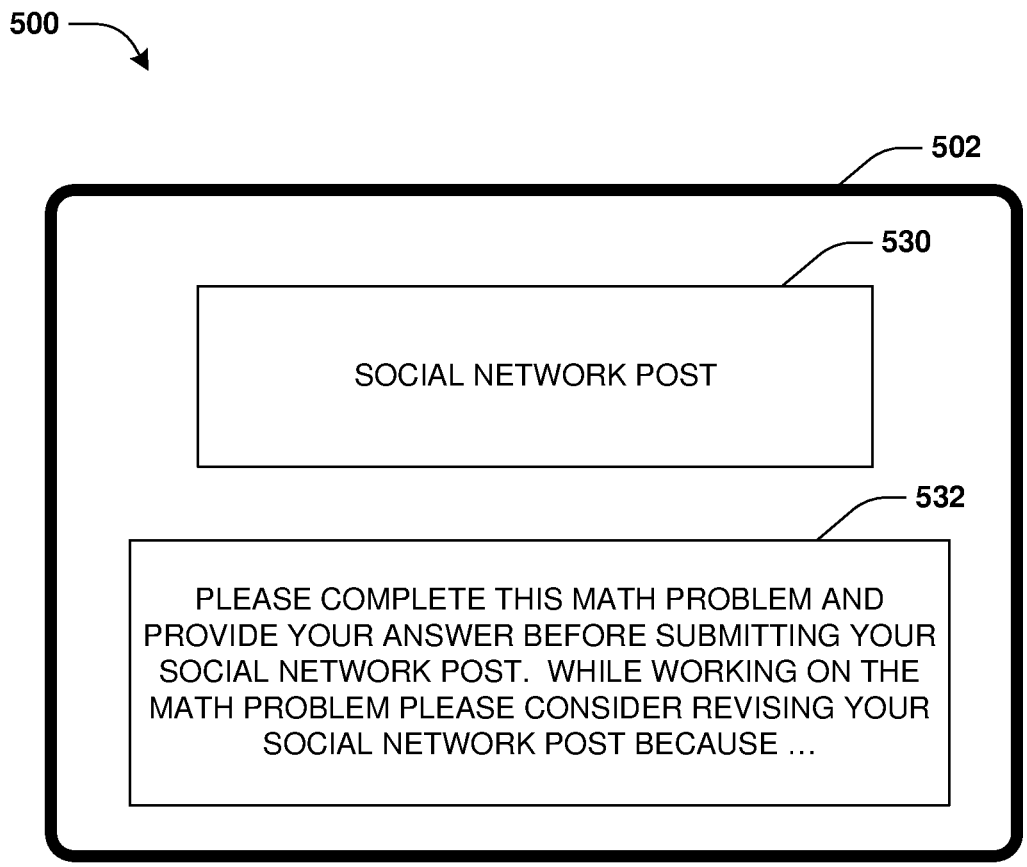
FIG. 5C is a component block diagram illustrating an example system for implementing automated barriers and delays for communication, where a math problem is provided.

In one example, the user may be posting a social network post 530 to a social network, as illustrated by FIG. 5C. The social network post 530 may be evaluated to classify the social network post 530. For example, the social network post 530 may be classified as a controversial classification of information likely to illicit strong and/or negative feels in others. The controversial classification may be determined to be within the list of classifications that will trigger the implementation of a barrier or delay. The controversial classification may be mapped to a math problem activity for the user to complete before being able to submit the social network post 530 to post to the social network. Accordingly, a user interface 532 may be generated and populated with the math problem activity. Upon successful completion of the math problem activity, the user will be provided with the ability to post the social network post 530. Otherwise, the user may be blocked from posting the social network post 530. The user interface 532 may be populated with a message explaining why the social network post 530 was classified as controversial (e.g., certain words or phrases may be highlighted). The user interface 532 may be populated with proposed revisions to make the text message 520 not controversial (e.g., certain phrases may be reworded, a link may be removed, other phrases may be removed, etc.). The user interface 532 may provide a video, an audio message, a text message, an image, or other information explaining the consequence of posting the social network post 530.

Figure 5D:
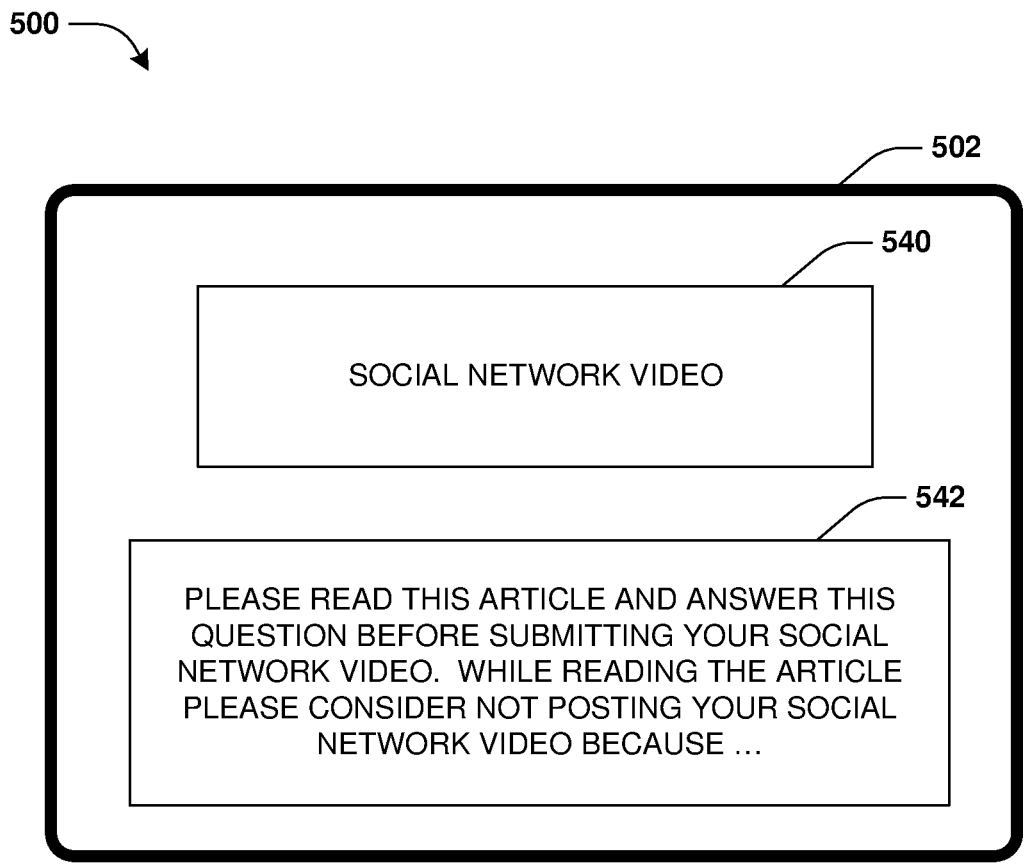
FIG. 5D is a component block diagram illustrating an example system for implementing automated barriers and delays for communication, where an article and question is provided.

In one example, the user may be posting a social network video 540 to a social network, as illustrated by FIG. 5D. The social network video 540 may be evaluated to classify the social network video 540. For example, the social network video 540 may be classified as a racist classification. The racist classification may be determined to be within the list of classifications that will trigger the implementation of a barrier or delay. The racist classification may be mapped to an article activity that the user is to read an article (e.g., an article displayed through a user interface 542 or linked to by the user interface 542) and answer one or more questions about the article before being able to submit the social network video 540 to post to the social network. The article may be selected based upon a topic of the article relating to the racist classification (e.g., an article about a person that lost their job after posting a racist social network video). Accordingly, the user interface 542 may be generated and populated with the article activity. Upon the user successfully answer the questions about the article, the user will be provided with the ability to post the social network video 540. Otherwise, the user may be blocked from posting the social network video 540. The user interface 542 may be populated with a message explaining why the social network video 540 was classified as racist (e.g., certain words or phrases may be highlighted, an image may be marked up to show a portion of the image deemed to be racists, etc.). The user interface 542 may provide a video, an audio message, a text message, an image, or other information explaining the consequence of posting the social network video 540.

Figure 5E:
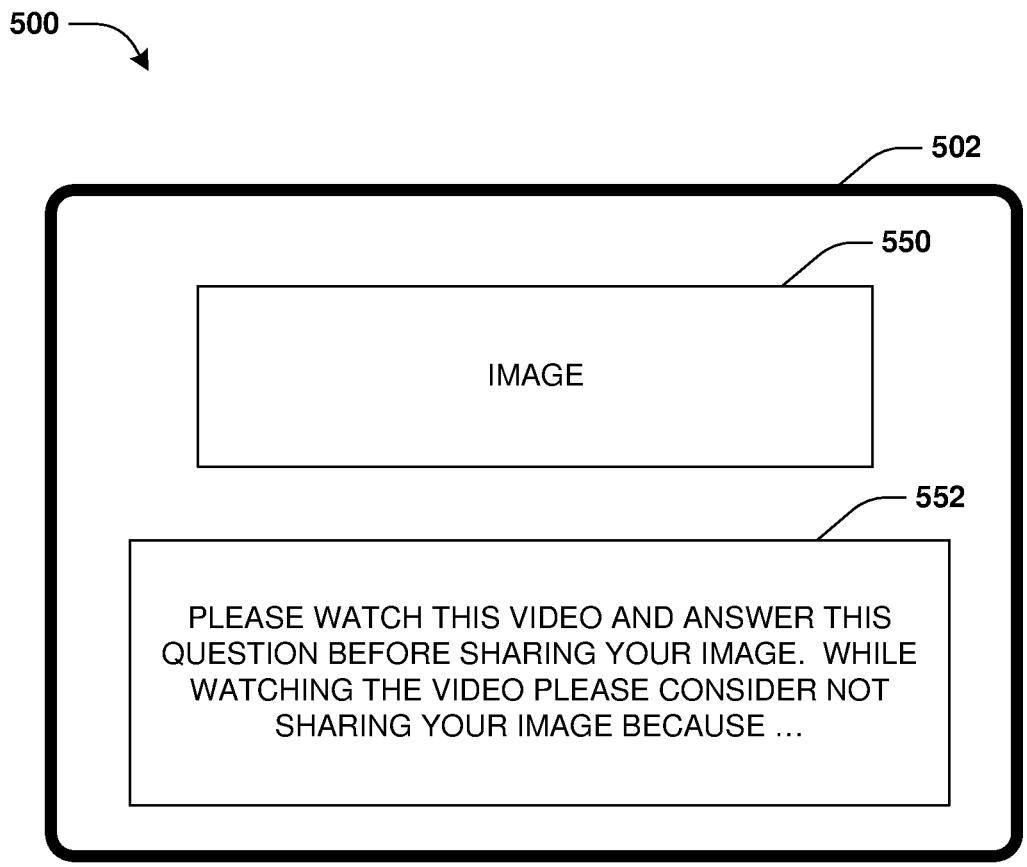
FIG. 5E is a component block diagram illustrating an example system for implementing automated barriers and delays for communication, where a video and question is provided.

In one example, the user may be posting an image 550 to a forum, as illustrated by FIG. 5E. The image 550 may be evaluated to classify the image 550. For example, the image 550 may be classified as a sexist classification. The sexist classification may be determined to be within the list of classifications that will trigger the implementation of a barrier or delay. The sexist classification may be mapped to a video activity such that the user is to watch a video (e.g., a video displayed through a user interface 552 or linked to by the user interface 552). The video activity may include one or more questions that must be answered correctly by the user or the video activity may instead include a time period (e.g., a time period derived from a length of the video) after which the user can submit the image 550 to post to the forum. The video may be selected based upon a topic of the video relating to the sexist classification (e.g., a video about a person that was publically shamed after posting a sexist image). Accordingly, the user interface 552 may be generated and populated with the video activity. Upon the user successfully answering the questions about the video or expiration of the time period, the user will be provided with the ability to post the image 550. Otherwise, the user may be blocked from posting the image 550. The user interface 552 may be populated with a message explaining why the image 550 was classified as sexist. The user interface 552 may provide a video, an audio message, a text message, an image, or other information explaining the consequence of posting the image 550.

Figure 5F:
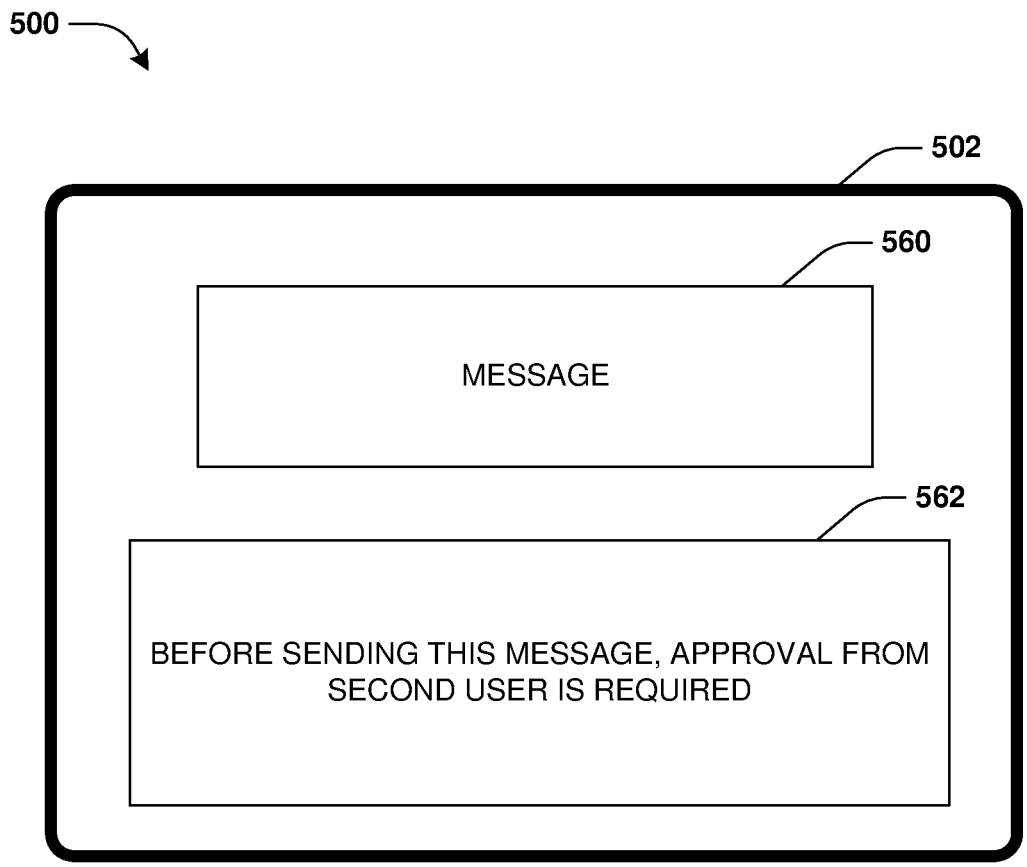
FIG. 5F is a component block diagram illustrating an example system for implementing automated barriers and delays for communication, where approval from a second user is required.

In one example, the user may be sending a message 560 to a recipient, as illustrated by FIG. 5F. The message 560 may be evaluated to classify the message 560. For example, the message 560 may be classified as a bullying classification. The bullying classification may be determined to be within the list of classifications that will trigger the implementation of a barrier or delay. The bully classification may be mapped to an obtain approval activity for the user to complete before being able to send the message 560. Accordingly, a user interface 562 may be generated with a notification that the message 560 is being provided to a second user for approval. The message 560 may be transmitted to a device of the second user for approval. User input, such as through the device of the second user, may be verified as being approval or disapproval from the second user for submitting the message 560. The second user may be predefined or selected by the user from a list of predefined users allowed to provide consent for sending electronic communication of certain classifications (e.g., different users may be allowed to approve certain classifications of content). The particular second user and/or a number of second users needed for approval may be determined based upon the classification, a severity of a consequence of the message 560 being sent, and/or a likelihood of the consequence.

Upon successful approval from the second user, the user will be provided with the ability to send the message 560. Otherwise, the user may be blocked from sending the message 560. The user interface 562 may be populated with a message explaining why the message 560 was classified as controversial (e.g., certain words or phrases may be highlighted). The user interface 562 may be populated with proposed revisions in order to make the message 560 not controversial (e.g., certain phrases may be reworded, a link may be removed, an image may be removed, other phrases may be removed, etc.). The user interface 562 may provide a video, an audio message, a text message, an image, or other information explaining the consequence of sending the message 560.

It may be appreciated that a variety of other activities may be provided, such as playing a game (e.g., play a race in a racing videogame), a suggested physical activity (e.g., taking a walk or counting to 20), etc. The user interface may be populated with a variety of information, such as a message (e.g., a text message, an audio message, a video message, etc.) describing a potential consequence of the content being submitted. The user interface may be populated with the content having certain phrases or portions of an image modified (e.g., highlighted text, a text color change, a circle drawn around a portion of an image, or other display property modifications). The user interface may be populated with altered content of proposed modifications, such as where certain terms are modified/altered, so that the altered content is no longer classified the same as the original content.

In an example, instances of the user generating content having certain classifications may be tracked to generate metrics indicative of how often or frequently the user generates content having each classification type. An activity may be selected from a set of activities based upon the metrics. Each activity within the set of activities may be associated with thresholds of how frequently content is generated with a certain classification. Thus, if a metric of the user generating content with a particular classification is within a threshold mapped to an activity, then that activity may be used. In an example, a cool off period is selected if a metric of a classification is between 0 to 2 instances of the user having generated content with the classification. A watch and answer questions about a video activity is selected if the metric is between 3 and 5 times. An obtain approval activity is selected if the metric is over 5 times.

Figure 6:
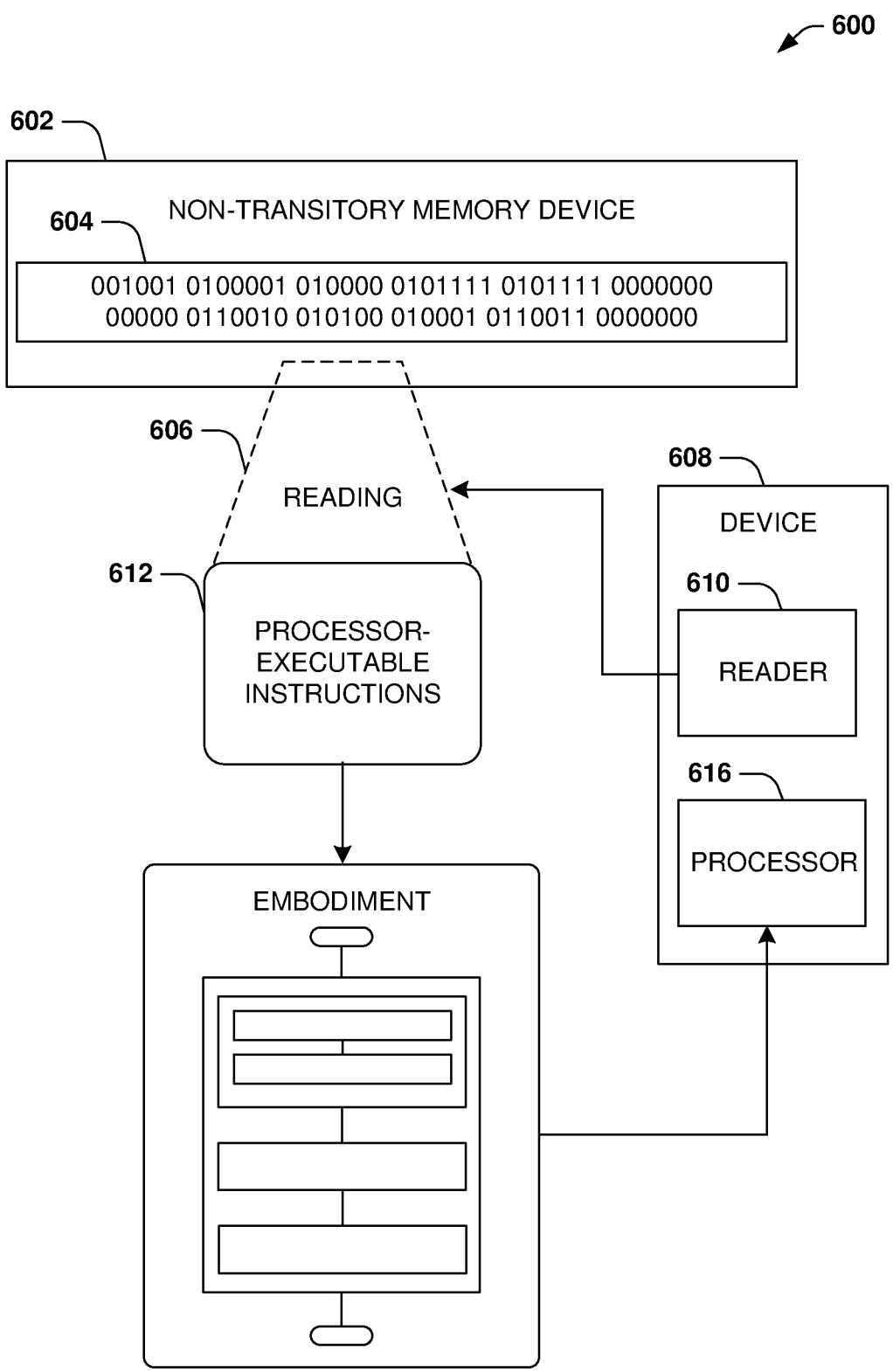
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    executing, on a processor of a computing device, instructions that cause the computing device to perform operations, the operations comprising:
        evaluating content at least one of generated or identified by a user to classify the content, wherein the content is not yet submitted for access by other users;
        responsive to a classification of the content indicating that the content is deemed to potentially result in one or more negative consequences comprising at least one of job loss, shame, annoyance, or hurt feelings if the content is transmitted to one or more potential recipients:
            generating a user interface populated with an activity for the user to perform, wherein the user is restricted from submitting the content until successful performance of the activity; and
        upon determining that the user successfully performed the activity, providing the user with an option to submit the content.

2. The method of claim 1, comprising:
    generating at least one of a puzzle, a game, or a math problem as the activity.

3. The method of claim 1, wherein the activity is a cool off period the user is to wait before being able to submit the content.

4. The method of claim 1, comprising:
    playing a video through the user interface;
    displaying a question regarding content of the video; and
    determining that the user successfully performed the activity of watching the video based upon an answer submitted by the user through the user interface for the question being determined as a correct answer.

5. The method of claim 1, wherein the content comprises at least one of an email, a text message, a social network message, a social network post, a video post, an image, a social network comment on a post, or a link to external content.

6. The method of claim 1, comprising:
    displaying an article, comprising information about a topic, through the user interface.

7. The method of claim 6, comprising:
    displaying a question regarding content of the article; and
    determining that the user successfully performed the activity of reading the article based upon an answer submitted by the user through the user interface for the question being determined as a correct answer.

8. The method of claim 1, comprising:
    playing a video through the user interface, wherein the video is selected based upon the video having a topic corresponding to a consequence of content having the classification being submitted for other users to view; and
    determining that the user successfully performed the activity of watching the video based upon an expiration of a time period.

9. The method of claim 1, wherein the activity corresponds to the user obtaining approval from a second user, wherein the content is provided to the second user for review.

10. The method of claim 9, comprising:
    verifying user input as being approval from the second user for submitting the content.

11. The method of claim 1, wherein the user interface is generated responsive to the classification being determined to be within a list of classifications, associated with at least one of a barrier or delay, comprising at least two of an anger classification, a racist classification, a controversial topic classification, a hurtful classification, a slanderous classification, a sexist classification or an inappropriate classification.

12. The method of claim 9, wherein the user selects the second user from a predefined list of users.

13. The method of claim 1, comprising:
    modifying a display property of one or more terms within the content used to determine the classification of the content.

14. The method of claim 1, comprising:
    modifying the content to alter one or more terms within the content used to determine the classification of the content to create altered content; and
    displaying the altered content as a suggestion for the user to submit in place of the content.

15. The method of claim 1, comprising:
    providing the user with an override option to submit the content without successfully performing the activity.

16. A computing device comprising:
    a processor; and
    memory comprising processor-executable instructions that when executed by the processor cause performance of operations, the operations comprising:
        evaluating content generated by a user to classify the content, wherein the content is not yet submitted for access by other users;
        determining a severity of a consequence, for the user, of the content being submitted;
        based upon the severity of the consequence, for the user, of the content being submitted, selecting an activity, from among a plurality of activities comprising the activity and a second activity, for the user to perform, wherein the activity is associated with a first severity of a first consequence for the user and the second activity is associated with a second severity of a second consequence for the user;
        generating a user interface populated with the activity, wherein the user is restricted from submitting the content until successful performance of the activity; and upon determining that the user successfully performed the activity, providing the user with an option to submit the content.

17. The computing device of claim 16, wherein the first consequence associated with the activity is job loss.

18. The computing device of claim 16, wherein at least one of the first consequence associated with the activity or the second consequence associated with the second activity comprises at least one of shame, annoyance, or hurt feelings.

19. A non-transitory machine readable medium having stored thereon processor-executable instructions that when executed cause performance of operations, the operations comprising:

evaluating content generated by a user to classify the content, wherein the content is not yet submitted for access by other users;

generating a user interface populated with an activity for the user to perform based upon a classification of the content, wherein the user is restricted from submitting the content until successful performance of the activity;

based upon the classification of the content generated by the user, selecting an article, comprising information about a topic relating to the classification of the content generated by the user, from among a plurality of articles associated with one or more topics relating to one or more classifications of content;

displaying (i) the article selected from among the plurality of articles and (ii) a question about the article through the user interface; and upon determining that the user successfully performed the activity based upon an answer submitted by the user through the user interface for the question about the article being determined as a correct answer to the question about the article comprising the information about the topic relating to the classification of the content generated by the user, providing the user with an option to submit the content.

20. The non-transitory machine readable medium of claim 19, wherein the displaying comprises displaying two or more questions about the article.

\* \* \* \* \*